(12) United States Patent
Imai et al.

(10) Patent No.: US 6,798,829 B1
(45) Date of Patent: Sep. 28, 2004

(54) TRANSMITTING APPARATUS AND TRANSMITTING METHOD, RECEIVING APPARATUS AND RECEIVING METHOD, AND DISTRIBUTION MEDIUM

(75) Inventors: Kenichi Imai, Tokyo (JP); Takashi Koike, Kanagawa (JP); Minoru Tsuji, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/456,084

(22) Filed: Dec. 7, 1999

(30) Foreign Application Priority Data

Dec. 15, 1998 (JP) .......................................... P10-355972

(51) Int. Cl.[7] .............................. H04B 1/38; H04L 5/16
(52) U.S. Cl. ...................................... 375/222; 375/219
(58) Field of Search .......................... 375/219; 370/263, 370/396, 537; 369/30.04; 84/622–645

(56) References Cited

U.S. PATENT DOCUMENTS

| | | | |
|---|---|---|---|
| 5,231,492 A | * 7/1993 | Dangi et al. | 348/14.12 |
| 5,451,942 A | * 9/1995 | Beard et al. | 341/50 |
| 5,533,021 A | * 7/1996 | Branstad et al. | 370/396 |
| 5,804,754 A | * 9/1998 | Iwase et al. | 84/617 |
| 5,844,628 A | * 12/1998 | Hamano et al. | 348/616 |
| 5,881,245 A | * 3/1999 | Thompson | 709/219 |
| 5,900,566 A | * 5/1999 | Mino et al. | 84/610 |
| 5,902,949 A | * 5/1999 | Mohrbacher | 84/609 |
| 5,926,205 A | * 7/1999 | Krause et al. | 725/103 |
| 6,002,802 A | * 12/1999 | Chujoh et al. | 382/236 |
| 6,104,706 A | * 8/2000 | Richter et al. | 370/263 |
| 6,381,254 B1 | * 4/2002 | Mori et al. | 370/537 |
| 6,507,611 B1 | * 1/2003 | Imai et al. | 375/222 |

OTHER PUBLICATIONS

U.S. patent application Ser. No. 08/931,742, filed Sep. 16, 1997.
U.S. patent application Ser. No. 09/299,820, filed Apr. 26, 1999.
U.S. patent application Ser. No. 09/301,962, filed Apr. 29, 1999.
U.S. patent application Ser. No. 09/454,845, filed Dec. 7, 1999.

* cited by examiner

Primary Examiner—Stephen Chin
Assistant Examiner—Lawrence Williams
(74) Attorney, Agent, or Firm—Sonnenschein, Nath & Rosenthal LLP

(57) ABSTRACT

Upon reception of the group ID and sound volume control signal, a selecting means refers to a control group ID management memory to determined whether the part being supplied belongs to the received group ID or not. When it is determined that the part being supplied belongs to the received group ID, the selecting means transmits the sound volume control signal supplied to the control means. The control means receives this sound volume control signal received from the selecting means and executes the process corresponding to the sound volume control signal for the supplied signal (MIDI signal or audio signal) and then outputs such sound volume control signal. As explained above, the control manipulation in the receiving side can be simplified.

4 Claims, 21 Drawing Sheets

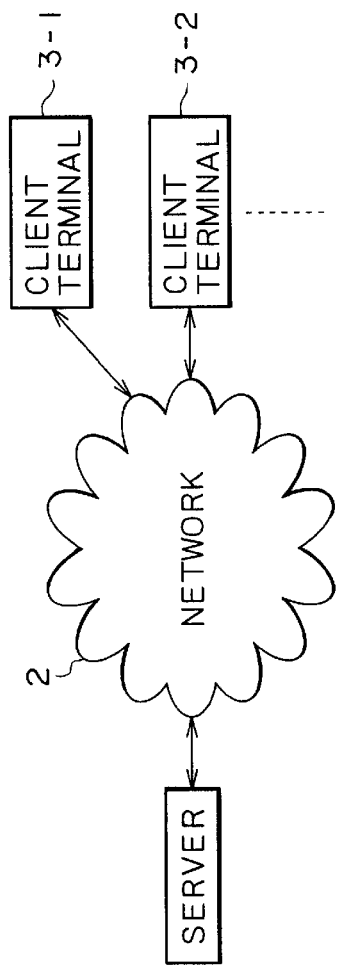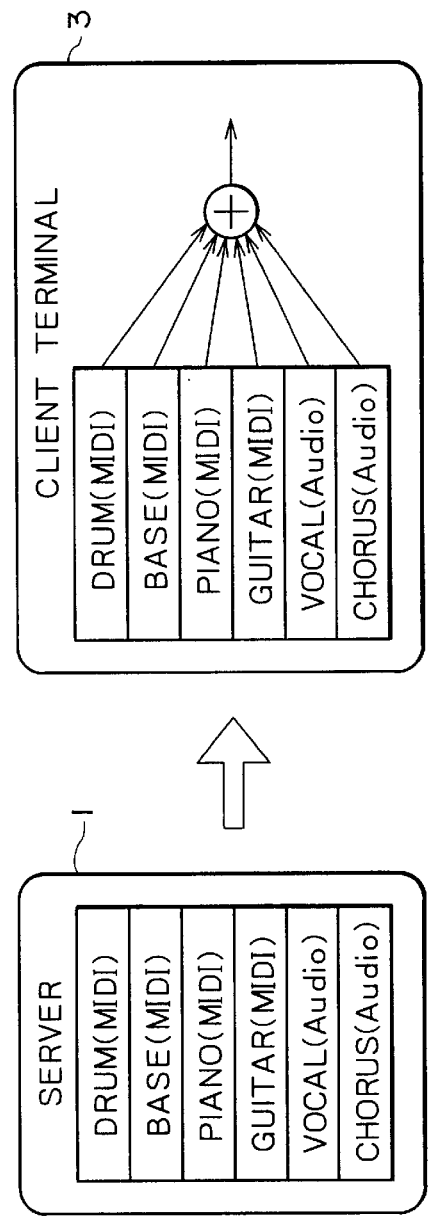

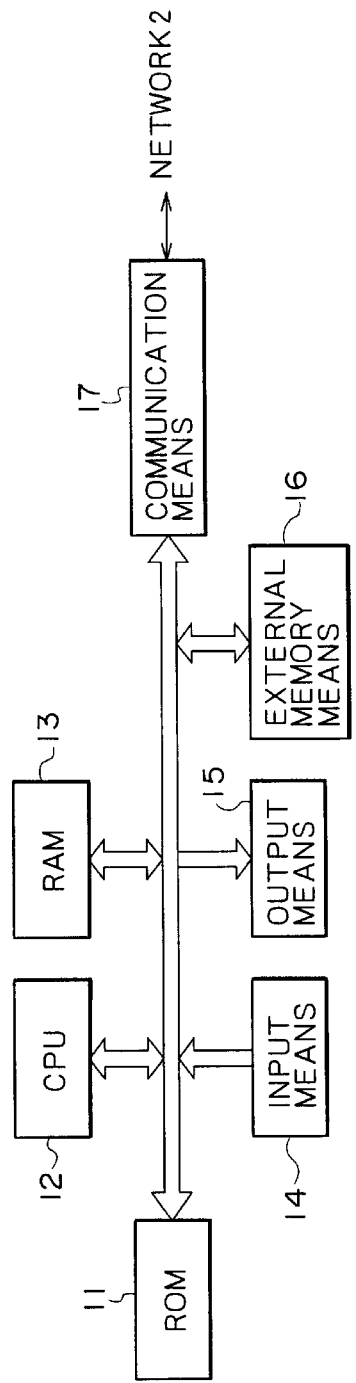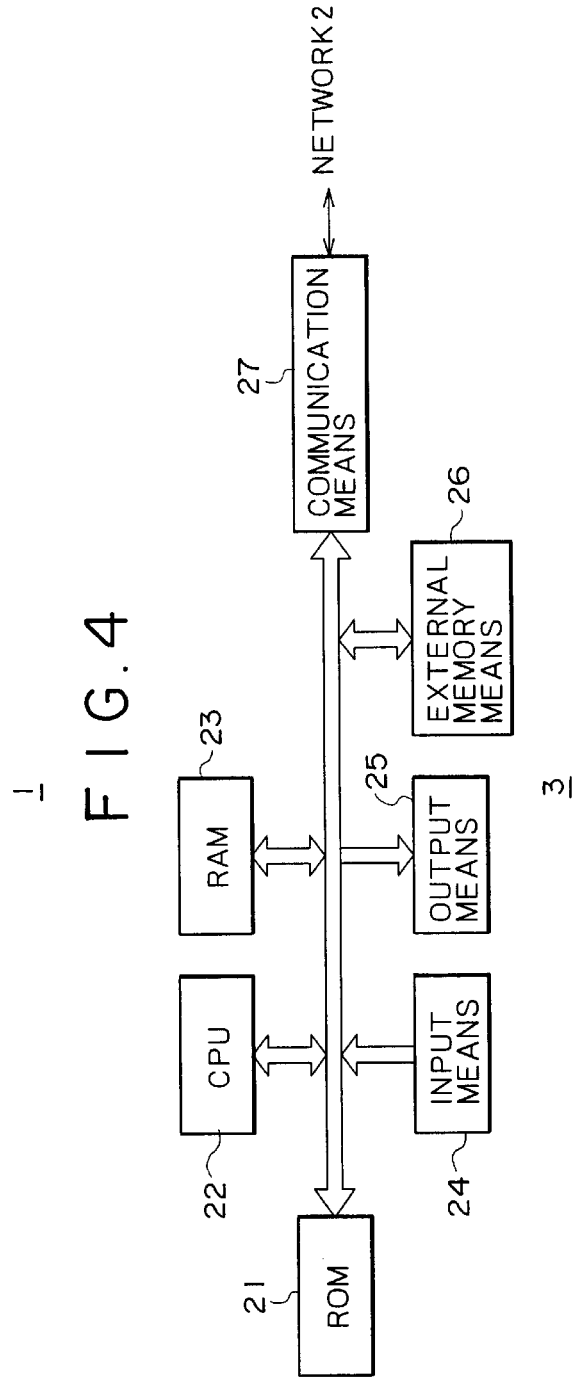

F I G. 5
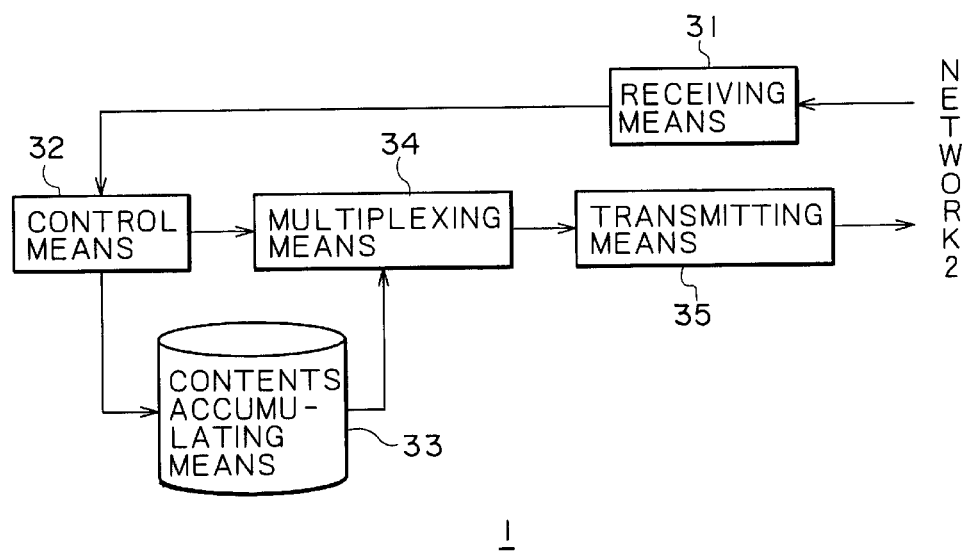
F I G. 7
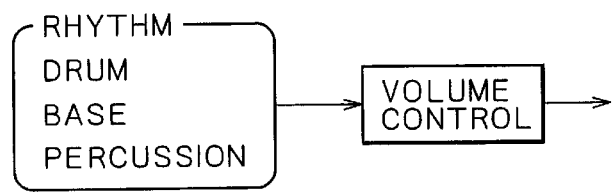

FIG. 11A

| MIDI ch1 | GROUP ID 0 |
|---|---|
| MIDI ch2 | GROUP ID 0 |
| MIDI ch3 | GROUP ID 1 |
| Audio ch1 | GROUP ID 0 |
| Audio ch2 | GROUP ID 2 |

FIG. 11B

| GROUP ID 0 | MIDI ch1, 2, Audio ch1 |
|---|---|
| GROUP ID 1 | MIDI ch3 |
| GROUP ID 2 | Audio ch2 |

FIG. 11C

| MIDI ch1 | NOTE 1 | GROUP ID 0 |
|---|---|---|
| ⋮ | ⋮ | ⋮ |
| MIDI ch1 | NOTE 12 | GROUP ID 0 |
| MIDI ch1 | NOTE 13 | GROUP ID 2 |
| ⋮ | ⋮ | ⋮ |
| MIDI ch1 | NOTE 17 | GROUP ID 2 |
| MIDI ch1 | NOTE 18 | GROUP ID 0 |
| MIDI ch1 | NOTE 20 | GROUP ID 1 |
| ⋮ | ⋮ | ⋮ |
| MIDI ch1 | NOTE 24 | GROUP ID 1 |
| MIDI ch1 | NOTE 25 | GROUP ID 2 |
| ⋮ | ⋮ | ⋮ |
| MIDI ch1 | NOTE 36 | GROUP ID 2 |

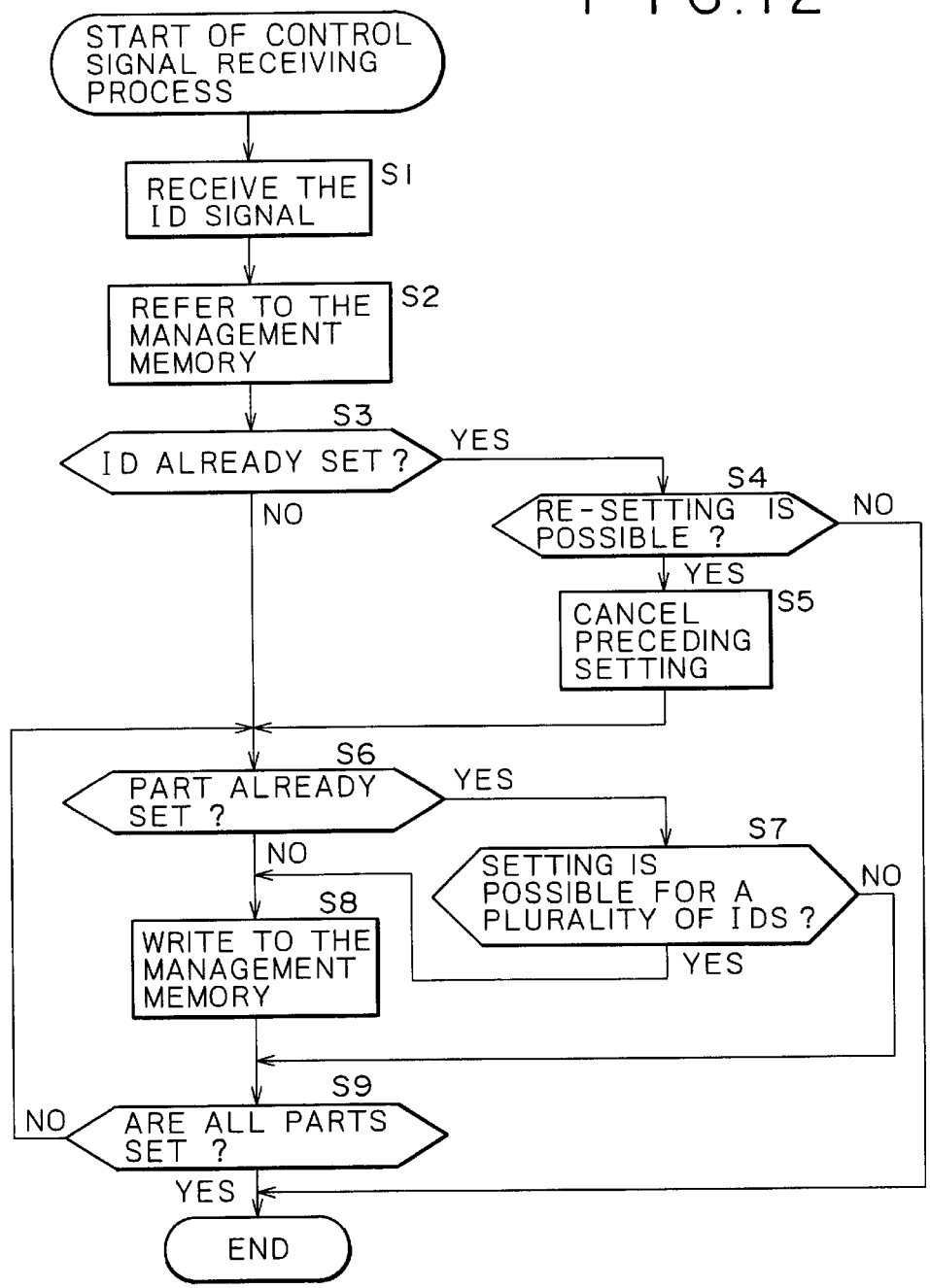

FIG. 15A
SLIDE BAR IS SET TO THE MAXIMUM POSITION
SLIDE BAR IS SET TO THE MINIMUM POSITION
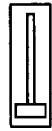
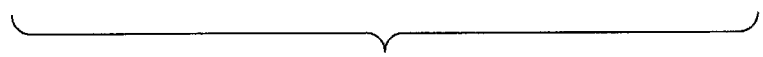
FIG. 15B
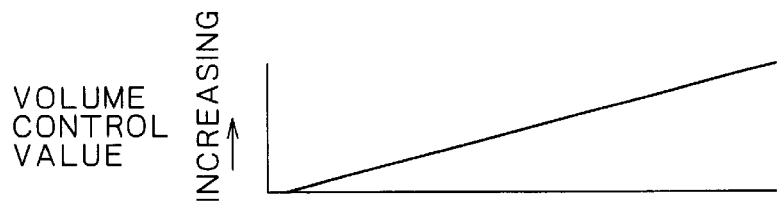
VOLUME CONTROL VALUE
FIG. 15C
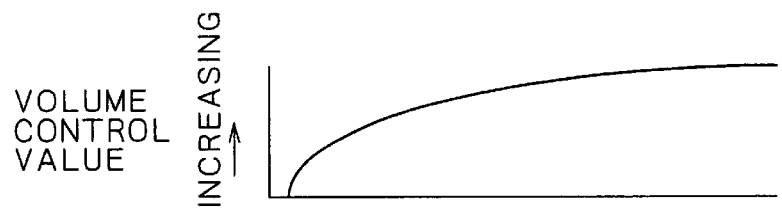
VOLUME CONTROL VALUE

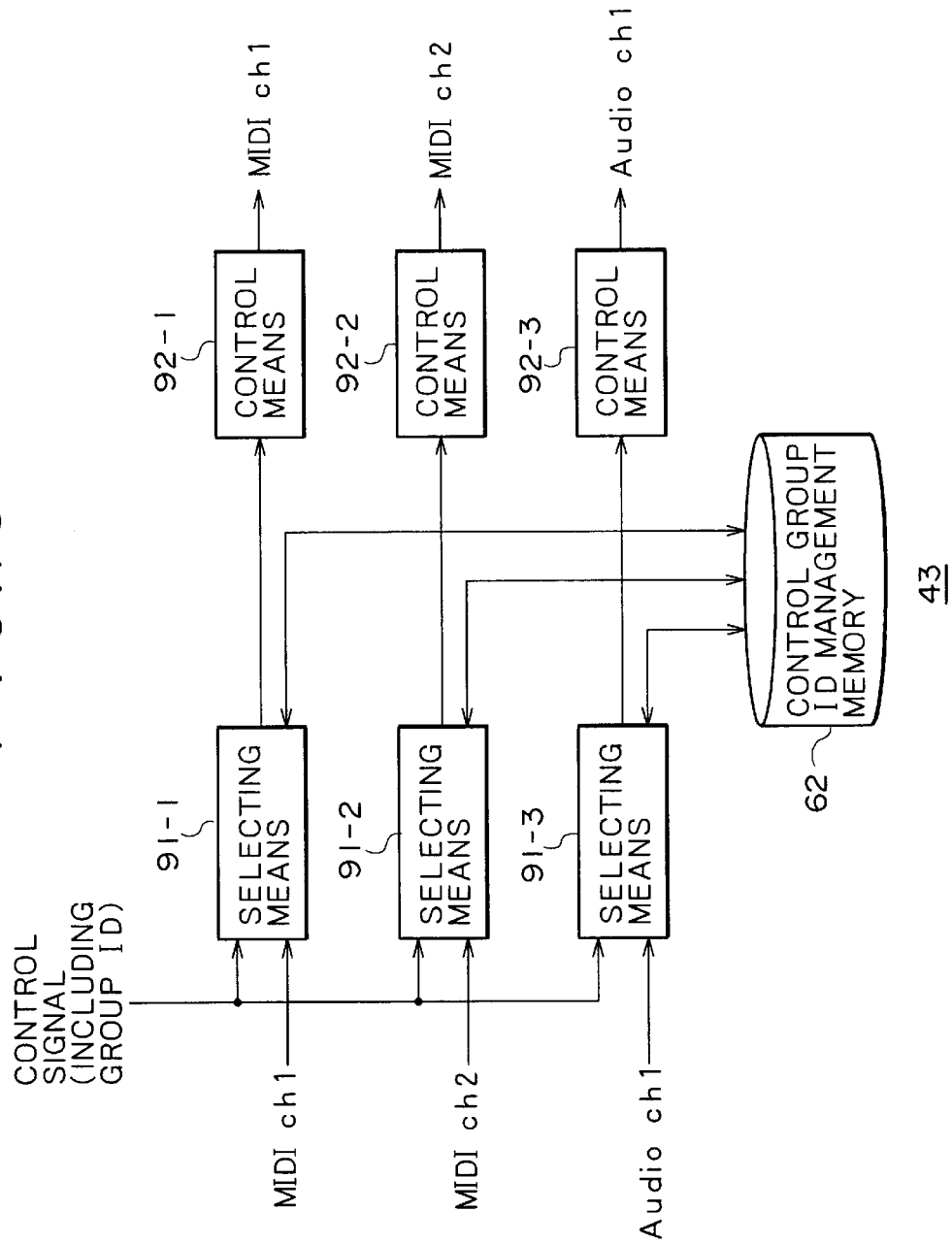

F I G. 17
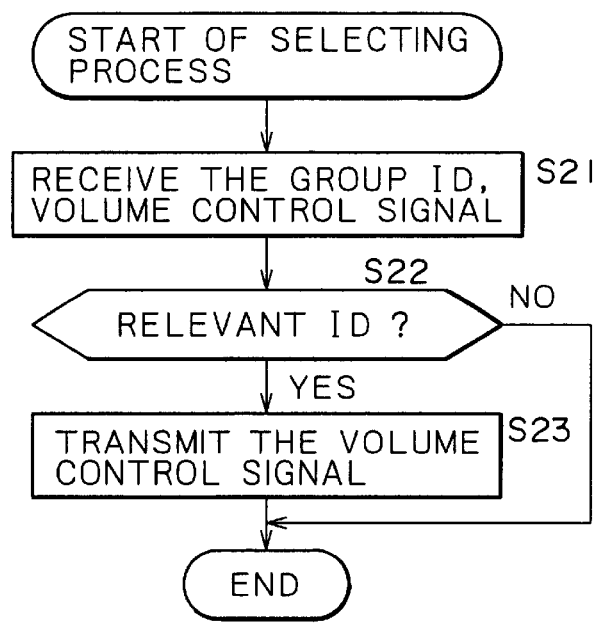
F I G. 18
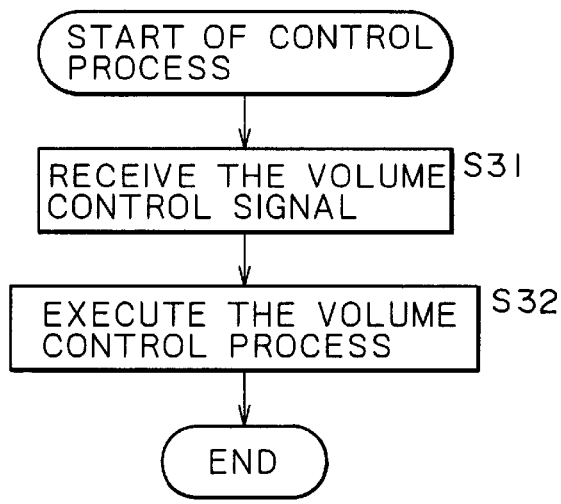

F I G. 30
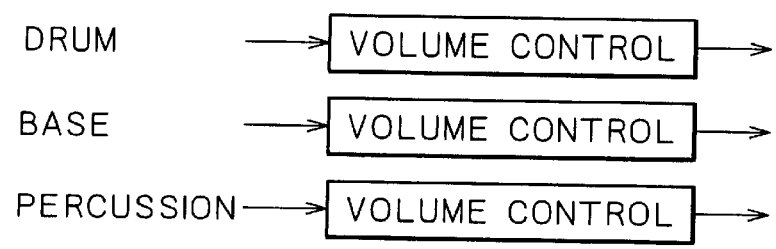
F I G. 31
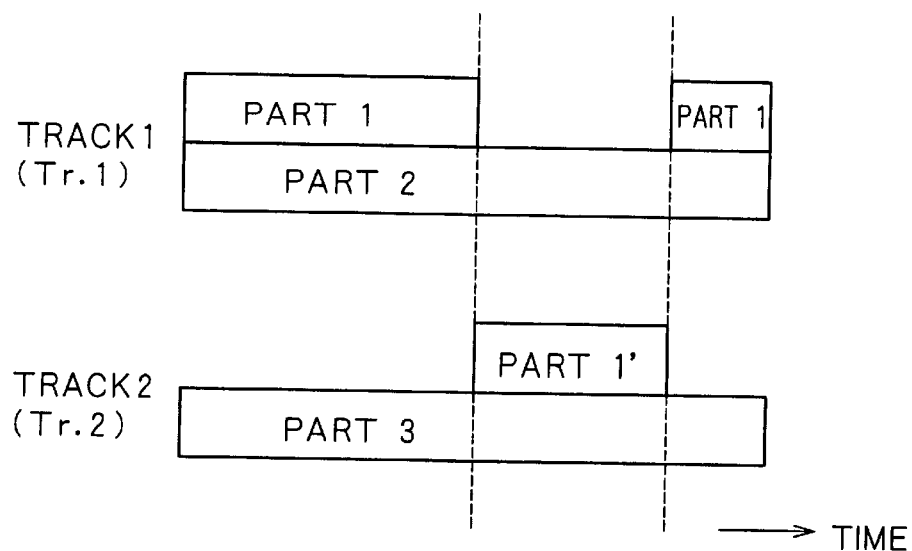

US 6,798,829 B1

TRANSMITTING APPARATUS AND TRANSMITTING METHOD, RECEIVING APPARATUS AND RECEIVING METHOD, AND DISTRIBUTION MEDIUM

BACKGROUND OF THE INVENTION

1. Field of the Invention

The present invention relates to a transmitting apparatus and a transmitting method, a receiving apparatus and a receiving method and a distribution medium and particularly to a transmitting apparatus and a transmitting method, a receiving apparatus and a receiving method and a distribution medium for encoding and transmitting digital audio signals of a plurality of parts and then receiving and decoding such digital audio signals in the receiving side to control the signals at a time for each group.

2. Description of Related Art

On the occasion of transmitting a digital audio signal to the receiving side from the transmitting side, for example, through a network such as the Internet, the audio signal is in general encoded with high efficiency up to about $\frac{1}{10}$ to $\frac{1}{100}$ and is then transmitted as the encoded data from the transmitting side and such encoded data is then decoded and reproduced at the receiving side.

Meanwhile, the audio signal offered through the network is generally a monaural signal or a stereo signal in which the sounds of a plurality of musical instruments and voices (of songs) are mixed. Therefore, it is possible, for example, to adjust to increase or decrease the sound volume in the right or left side in the receiving side but it is impossible to adjust to increase or decrease the sound volume of a certain musical instrument or a certain voice of song.

However, it is now requested in the receiving side to offer the service of higher user interactivity (offer of an audio signal having higher flexibility) in which, for example, only the sound volume of a certain musical instrument or voice is adjusted and moreover only the vocal part or accompaniment is intensified or the sounds of only several musical instruments are mixed.

In order to realize such service, the audio signals of a plurality of musical instruments and audio signals of voices are individually transmitted without mixing thereof, and these audio signals are decoded in the receiving side, and then these are mixed after individual controls. Thereby, if it is requested in the receiving side to adjust the sound level of each part, it is possible, as illustrated in FIG. 30, to receive the audio signal of each part of "drum", "bass" and "percussion" and then to mix these audio signals after individual control of the sound volume of each part.

However, the method explained above has a problem that it is possible to realize fine control of each part and the control manipulation in the receiving side is complicated.

Therefore, it has been proposed that a plurality of parts are grouped. In this method, for example, grouping is performed, as illustrated in FIG. 31, a plurality of parts belonging to the same group is assigned to the same track (channel). In an example of FIG. 31, a part 1 and a part 2 are grouped and are assigned to the track 1. Moreover, a part 1 and a part 3 are grouped and are assigned to the track 2. The part belonging to each track (group) changes from time to time. The track 1 and track 2 are respectively independent and can be controlled individually.

Track control in the receiving side is performed in the structure illustrated in FIG. 32. A user supplies a track number (Tr. No.) and a control signal corresponding thereto to a selecting means 121 via an input means not illustrated. The selecting means 121 selects the track control means 122-$i$ ($i$=1, 2 or 3) corresponding to the track No. supplied from the track control means 122-1 to 122-3 and supplies the control signal to the selected track control means 122-$i$. The track control means 122-$i$ processes the track data based on the supplied control signal to output the processed track data. The track control means 122-$i$ processes for all parts of the supplied track.

For example, in the example of FIG. 33, the parts of "drum", "bass" and "percussion" are grouped under "rhythm" during the period between the times T1 and T3 and are assigned to the track 1. Moreover, the part of "drum" is assigned to the track 2 as the "drum-solo" during the period T2. Since respective tracks are independent, if the sound level of track 1 is controlled, for example, during the period T1, the sound level of track 2 is never controlled. Therefore, here rises a problem, in this case, that the sound level of "drum-solo" of the track 2 relatively changes, during the period T2, in comparison with the sound level of "drum" during the period T1 and therefore the sound of "drum" becomes unnatural.

Moreover, in an example of FIG. 34, the parts "drum", "bass" and "percussion" are grouped as "rhythm" and assigned to track 1. In addition, the parts "drum" and "percussion" are grouped as "percussion instruments" and are assigned to track 2. In this case, the parts "drum" and "percussion" may be controlled in any one of the track 1 and track 2, but two of the same data are required resulting in a problem that the amount of data increases.

SUMMARY OF THE INVENTION

The present invention has been proposed considering the background explained above and it is therefore an object to provide the service of higher interactivity to assure easier control in the receiving side without increase in the amount of data of respective parts.

According to one aspect of the present invention, a transmitting apparatus for transmitting the data obtained by encoding a digital signal to the other apparatus via a network is characterized in comprising a memory means for storing the encoded data encoded previously for each part, a reading means for reading the encoded data of the corresponding part from a memory means depending on the request from the other apparatus, a multiplexing means for multiplexing the encoded data read by the reading means and a transmitting means for transmitting the encoded data multiplexed by the multiplexing means.

According to one aspect of the present invention, a transmitting method of a transmitting apparatus for transmitting the data obtained by encoding a digital signal to the other apparatus via a network is characterized in comprising the steps of a storing step for storing the encoded data encoded previously for each part, a reading step for reading the encoded data of the corresponding part, a multiplexing step for multiplexing the encoded data read in the reading step and transmitting step for transmitting the encoded data multiplexed in the multiplexing data.

According to one aspect of the present invention, a distribution medium is characterized in providing a computer-readable program for executing the processes including the steps of a storing step for storing the encoded data encoded previously for each part to the transmitting apparatus for transmitting the encoded data obtained by encoding a digital signal to the other apparatus via a network, a reading step for reading the encoded data of the corresponding part based on the request from the other apparatus, a multiplexing step for multiplexing the encoded data read in the reading step and transmitting step for transmitting the encoded data multiplexed in the multiplexing step.

According to one aspect of the present invention, a receiving apparatus for receiving the encoded data obtained by encoding a digital signal via a network is characterized in comprising a receiving means for receiving the encoded data, a separating means for separating the encoded data received by the receiving means into the encoded data for each part and the control information including a group ID, a decoding means for decoding the encoded data separated by the separating means, a management means for administrating the part corresponding to the group ID separated by the separating means, a setting means for setting the group of the part administrated by the management means to the predetermined group and a control means for controlling the encoded data decoded by the decoding means based on the group ID set by the setting means.

According to one aspect of the present invention, a receiving method of a receiving apparatus for receiving the encoded data obtained by encoding a digital signal via a network is characterized in comprising the steps of a receiving step for receiving the encoded data, a separating step for separating the encoded data received by the receiving step into the encoded data for each part and a control information including the group ID, a decoding step for decoding the encoded data separated by the separating step, a management step for administrating the part corresponding to the group ID separated by the separating step, a setting step for setting the group of the parts administrated by the management step to the predetermined group and a control step for controlling the encoded data decoded by the decoding step based on the group ID set by the setting step.

According to one aspect of the present invention, a distribution medium is characterized in providing, to a receiving apparatus for receiving, via a network, the encoded data obtained by encoding a digital signal, a computer-readable program for executing the processes including the steps of a receiving step for receiving the encoded data, a separating step for separating the encoded data received by the receiving step into the encoded data for each part and control information including the group ID, a decoding step for decoding the encoded data separated by the separating step, a management step for administrating the part corresponding to the group ID separated by the separating step, a setting step for setting the group of part administrated by the management step and a control step for controlling the encoded data decoded by the decoding step based on the group ID set by the setting step.

According one aspect of the present invention, in a transmitting apparatus, a transmitting method and a distribution medium, the encoded data encoded previously for each part is stored, the encoded data of corresponding part is read based on the request from the other apparatus, the readout encoded data is multiplexed and the multiplexed encoded data is transmitted.

According to one aspect of the present invention, in a receiving apparatus, a receiving method and a distribution medium, the encoded data is received, the received encoded data is separated into the encoded data for each part and control information including the group ID, the separated encoded data is decoded, the part corresponding to the separated group ID is administrated, the group of the administrated part is set to the predetermined group, and the decoded encoded data is controlled based on the preset group ID.

BRIEF DESCRIPTION OF THE DRAWINGS

FIG. 1 is a diagram illustrating a structural example of an embodiment of a transmission system to which the present invention is applied.

FID. 2 is a diagram for explaining data transmitted from the server 1 of FIG. 1.

FIG. 3 is a block diagram illustrating a structural example of hardware of the server 1 of FIG. 1.

FIG. 4 is a block diagram illustrating a structural example of hardware of a client terminal 3 of FIG. 1.

FIG. 5 is a block diagram illustrating a structural example for the functions of server 1 of FIG. 3.

Figure 6:
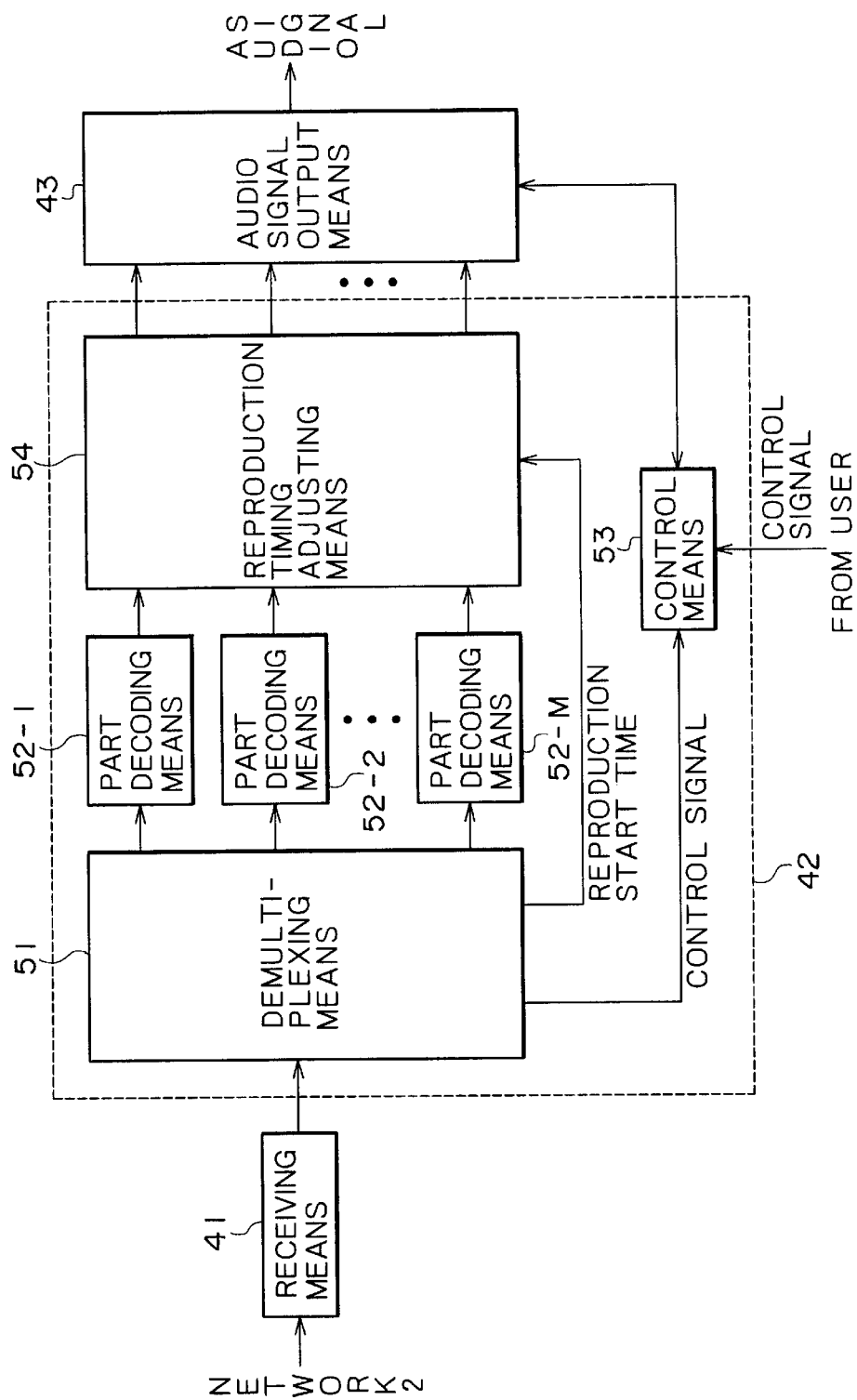

FIG. 6 is a block diagram illustrating a structural example for the functions of a client terminal 3 of FIG. 4.

FIG. 7 is a diagram for explaining the grouping.

Figure 8A:
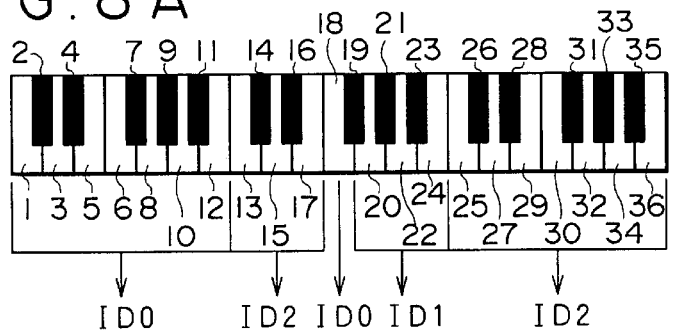
Figure 8B:
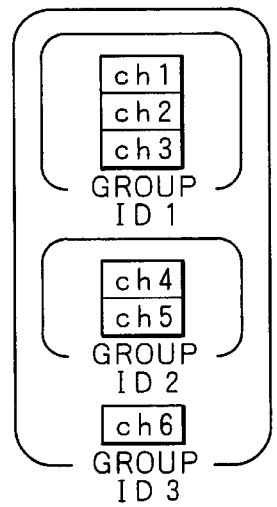

FIGS. 8A and 8B are diagrams for explaining the grouping.

FIGS. 9A to 9E are diagrams for explaining the timing for setting and canceling of the grouping.

Figure 10:
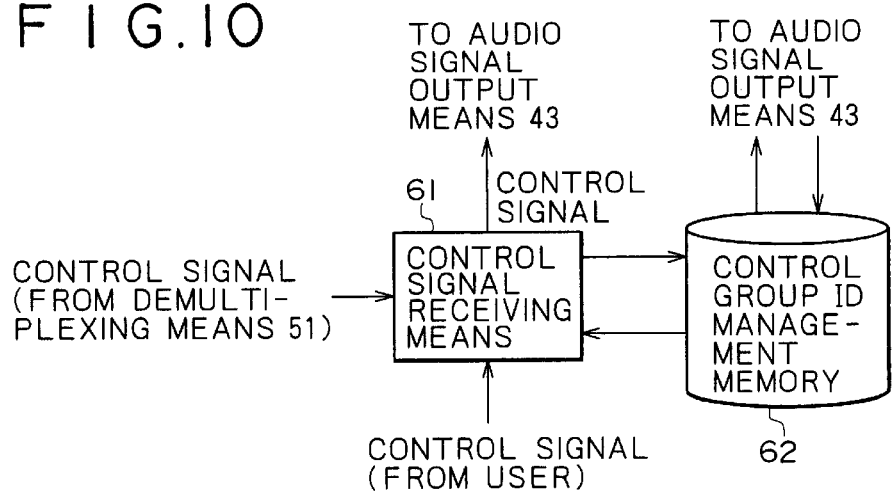

FIG. 10 is a block diagram illustrating a structural example for functions of the control means 53 of FIG. 6.

FIGS. 11A to 11C are diagrams for explaining the table administrated by a control group ID management memory 62 of FIG. 10.

FIG. 12 is a flowchart for explaining the processing operations of the control signal receiving means 61 of FIG. 10.

Figure 13:
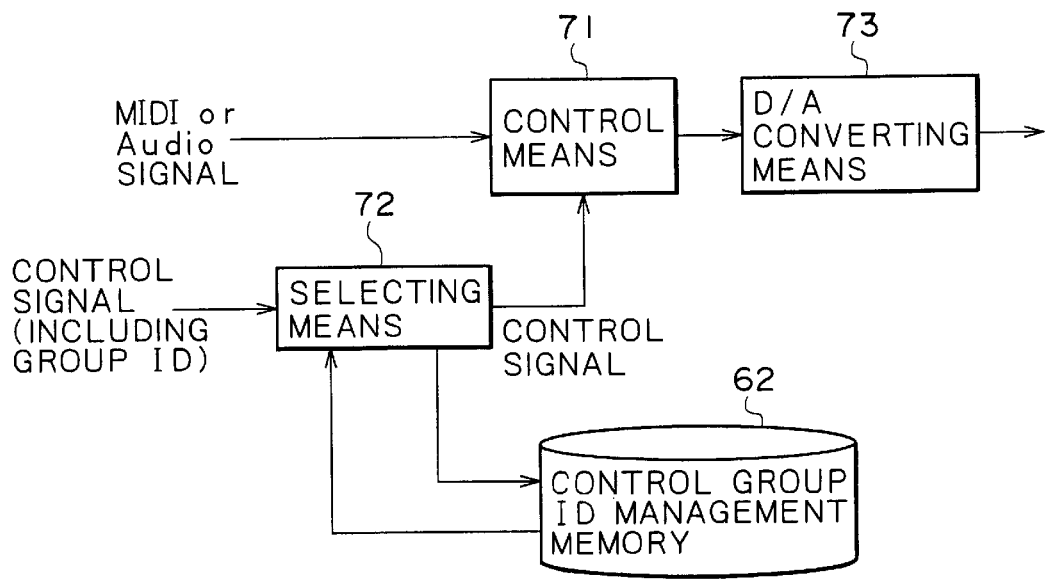

FIG. 13 is a block diagram illustrating a structural example for functions of the audio signal output mans 43 of FIG. 6.

Figure 14:
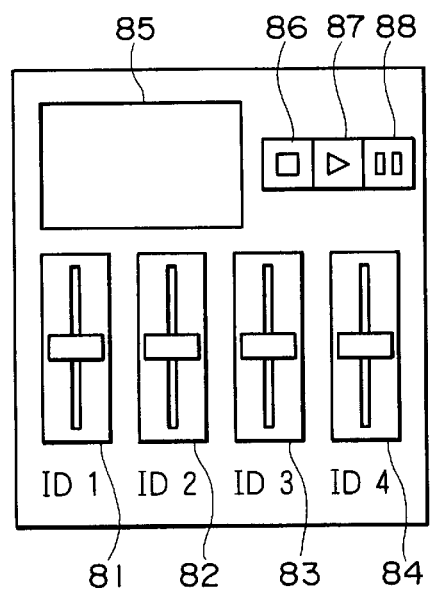

FIG. 14 is a diagram for explaining a manipulation panel displayed at an output means 25 of FIG. 4.

FIGS. 15A to 15C are diagrams for explaining slide bars 81 to 84.

FIG. 16 is a diagram illustrating another structural example of the audio signal output means 43 of FIG. 6.

FIG. 17 is a flowchart for explaining the processing operations of the selecting means 91-$i$ of FIG. 16.

FIG. 18 is a flowchart for explaining the processing operations of the control means 92-$i$ of FIG. 16.

Figure 19:
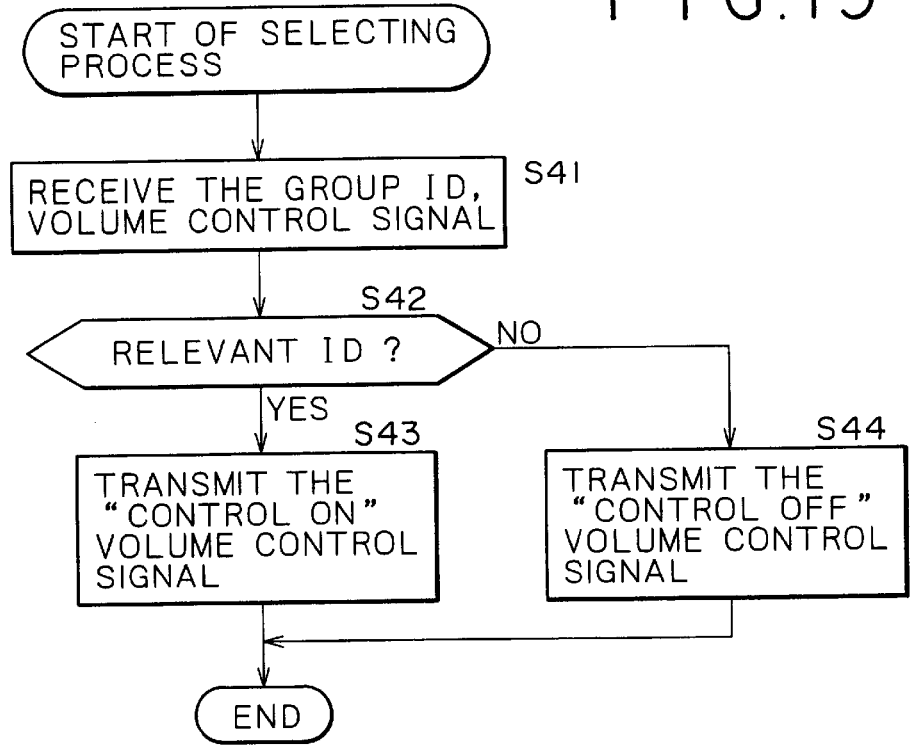

FIG. 19 is a flowchart for explaining the processing operations of the selecting means 91-$i$ of FIG. 16.

Figure 20:
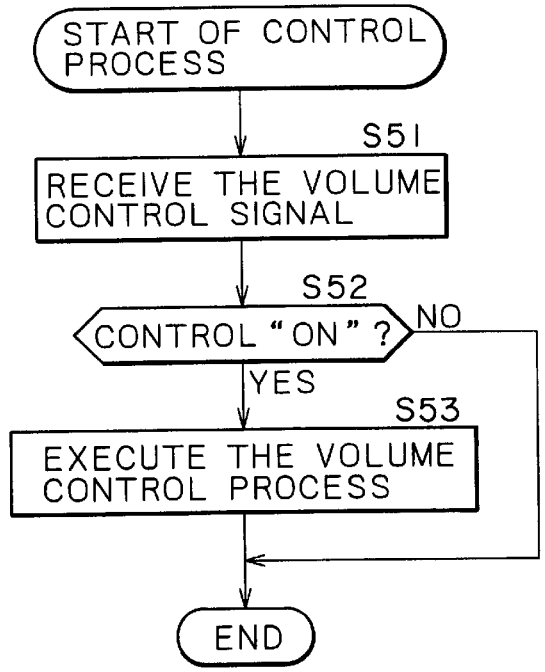

FIG. 20 is a flowchart for explaining the processing operations of a control means 92-$i$ corresponding to the process of the selecting means 81-$i$ of FIG. 19.

Figure 21:
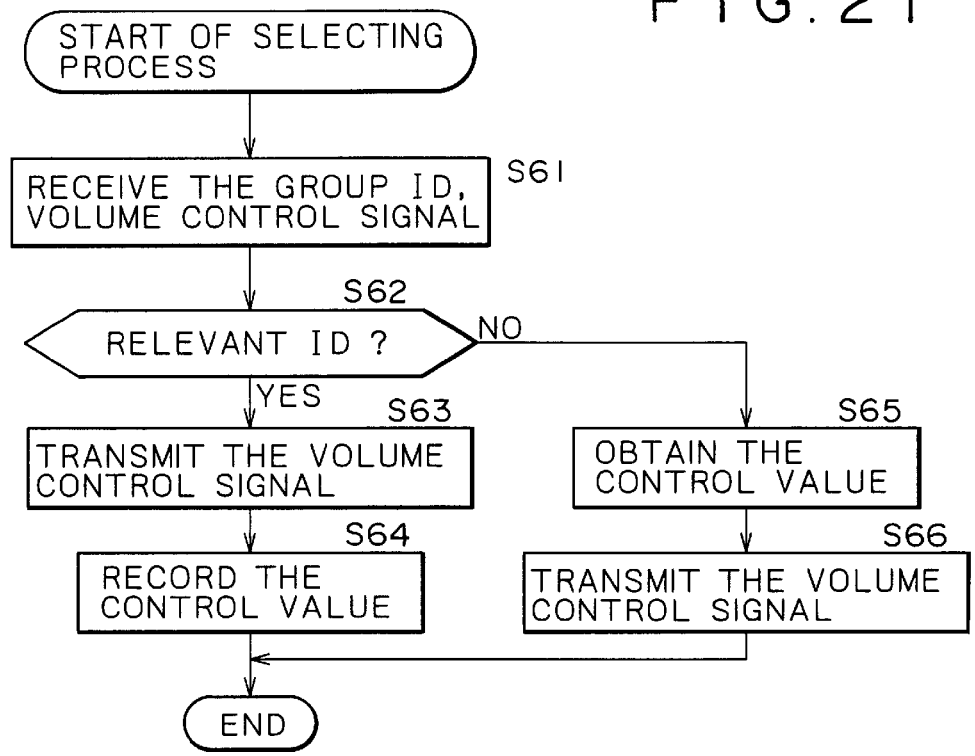

FIG. 21 is a flowchart for explaining the other processing operations of the selecting means 91-$i$ of FIG. 16.

Figure 22:
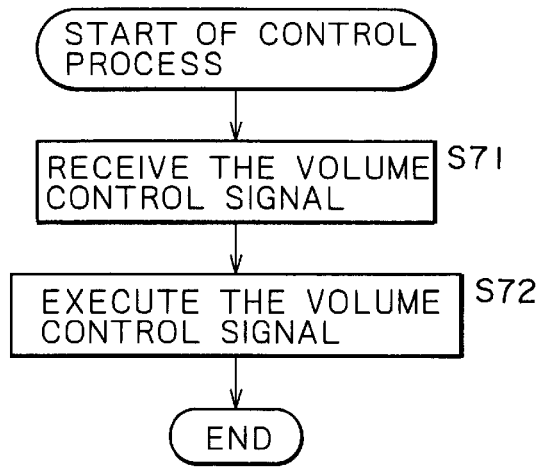

FIG. 22 is a flowchart for explaining the processing operations of the control means 92-$i$ corresponding to the process of the selecting means 91-$i$ of FIG. 21.

Figure 23:
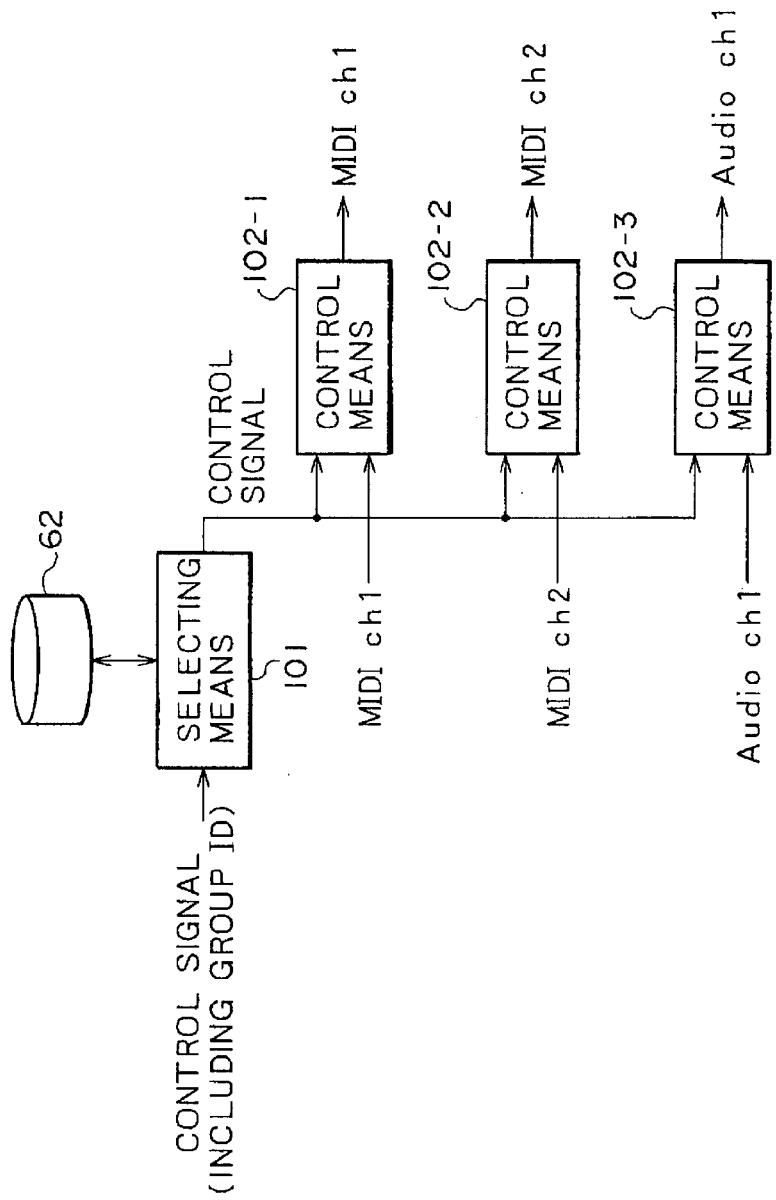

FIG. 23 is a diagram illustrating the other structural example of the audio signal output means 43 of FIG. 6.

Figure 24:
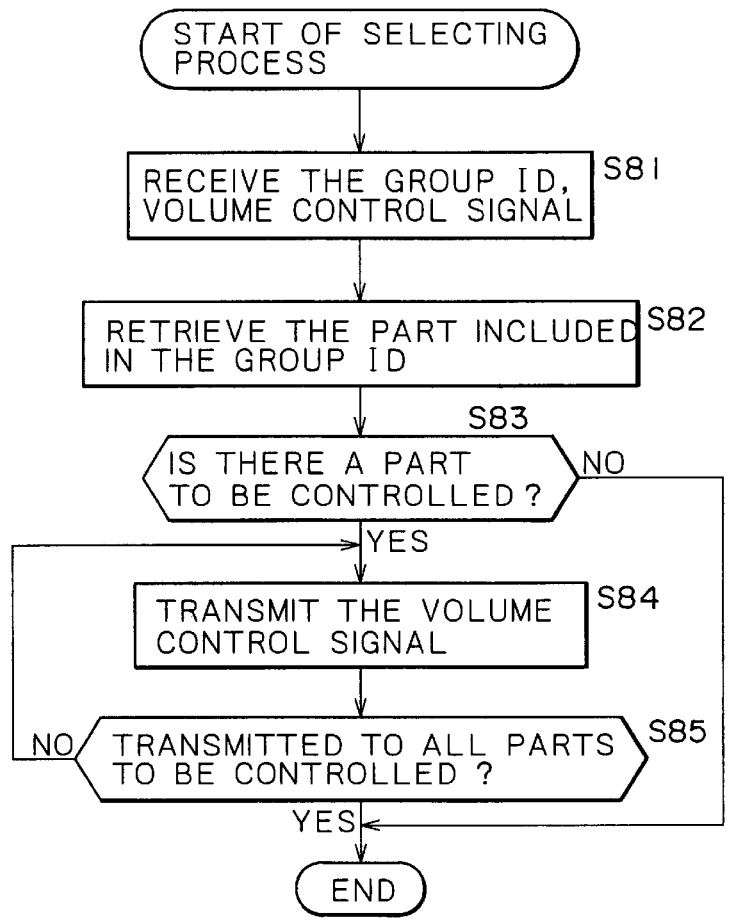

FIG. 24 is a flowchart for explaining the processing operations of the selecting means 101 of FIG. 23.

Figure 25:
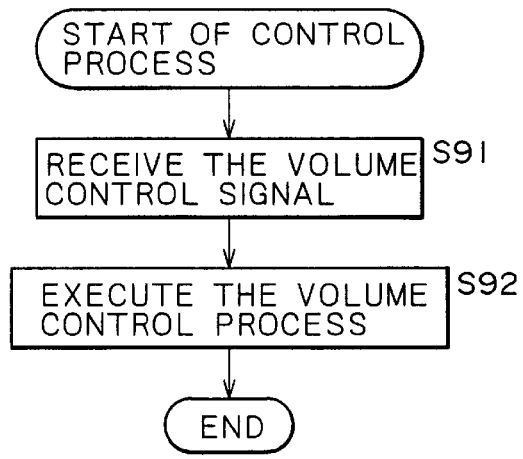

FIG. 25 is a flowchart for explaining the processing operations of the control means 102-$i$ of FIG. 23.

Figure 26:
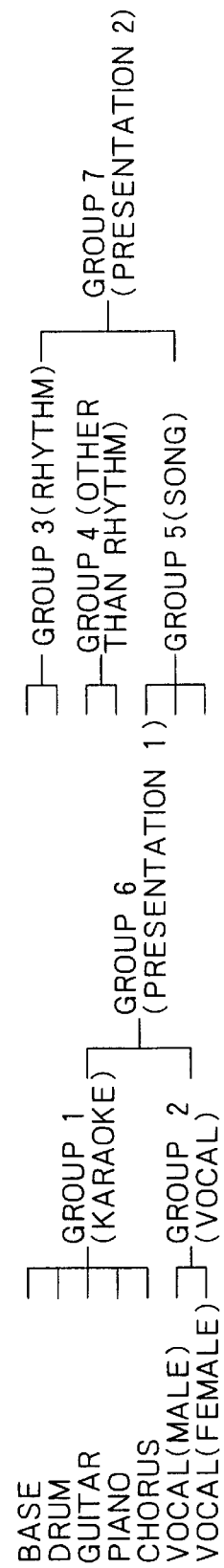

FIG. 26 is a diagram for explaining the grouping of the groups.

Figure 27:
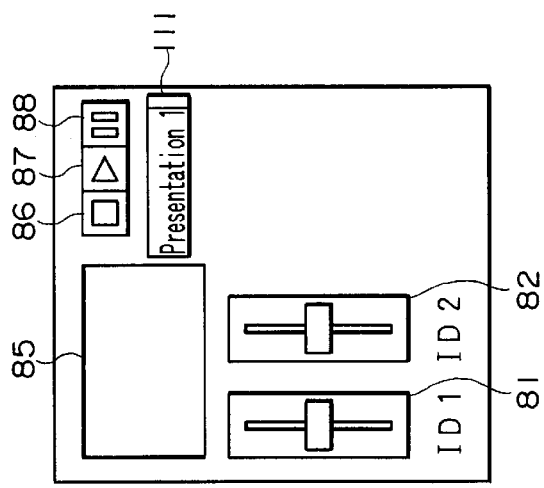

FIG. 27 is a diagram for explaining the manipulation panel displayed at the output means 25 of FIG. 4.

Figure 28:
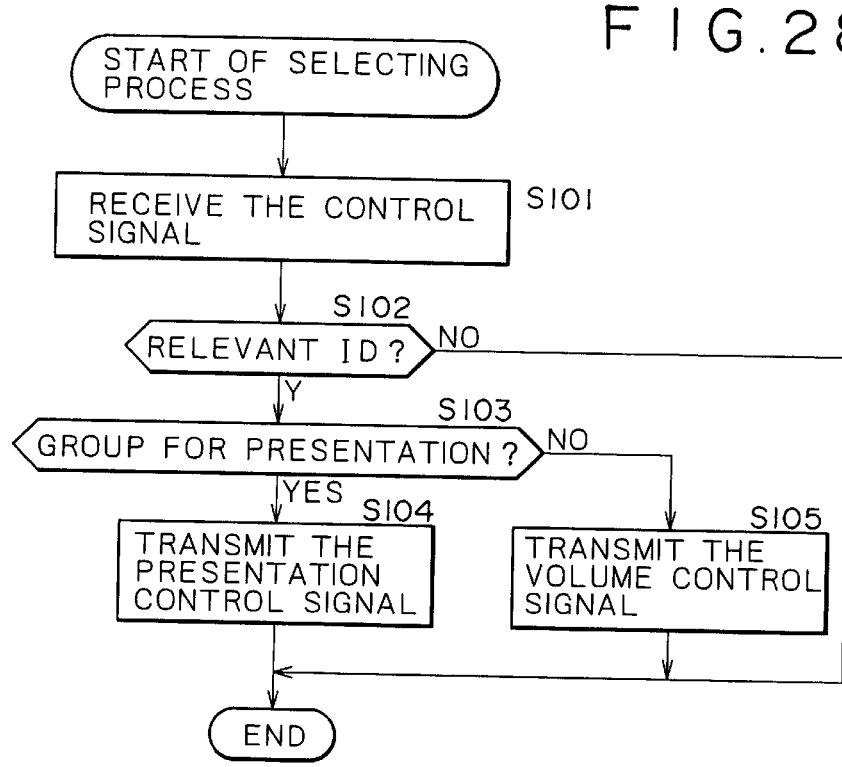

FIG. 28 is a flowchart for explaining the processing operations of the selecting means 91-$i$ of FIG. 16.

Figure 29:
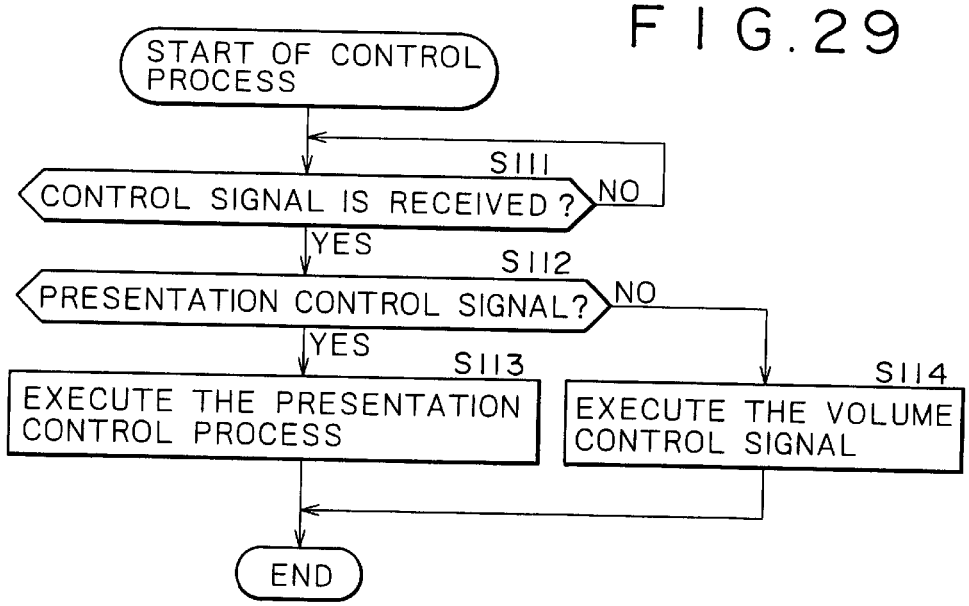

FIG. 29 is a flowchart for explaining the processing operations of the control means 92-$i$ corresponding to the process of the selecting means 91-$i$ of FIG. 28.

FIG. 30 is a diagram for explaining the sound volume control of each part.

FIG. 31 is a diagram for explaining the case where each part is assigned to the tracks.

Figure 32:
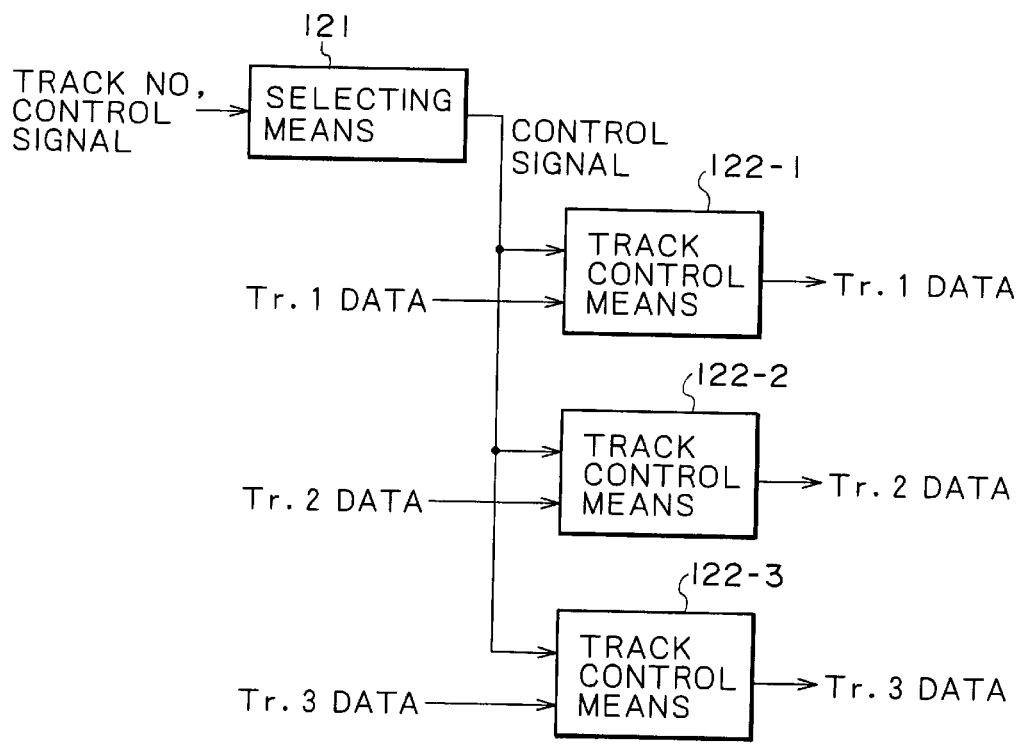

FIG. 32 is a diagram for explaining the track control of the related art.

Figure 33:
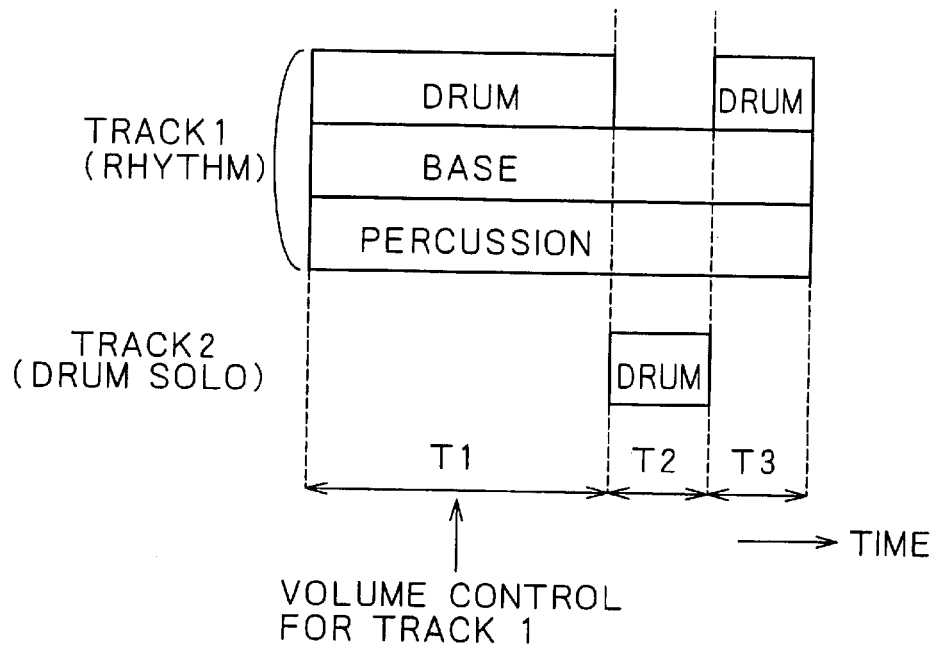

FIG. 33 is a diagram for explaining the control when each part is assigned to the tracks.

Figure 34:
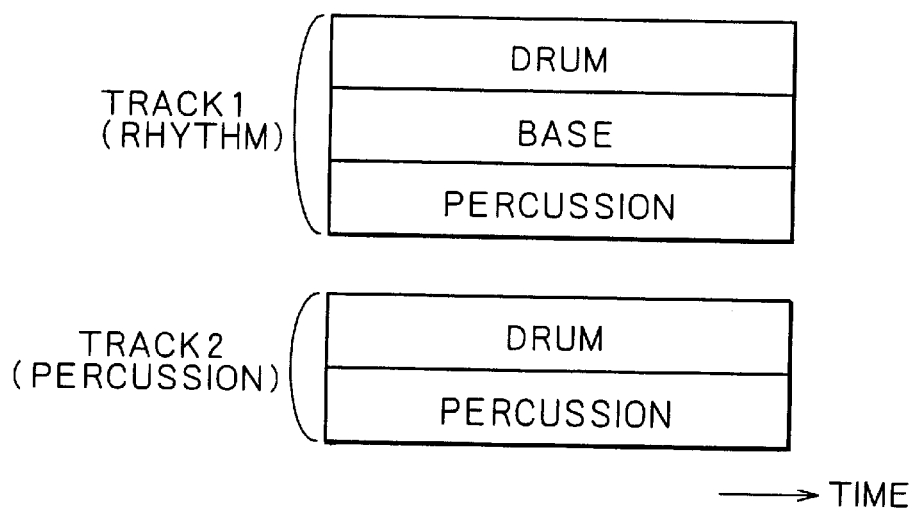

FIG. 34 is a diagram for explaining the control when the same part is assigned to a plurality of tracks.

DESCRIPTION OF THE PREFERRED EMBODIMENTS

The preferred embodiments of the present invention will be explained to describe the characteristics of the present invention with addition of the corresponding embodiment (only an example) in the parentheses after each means in order to make obvious correspondence between each means of the present invention and the preferred embodiment. This description, however, does not restrict each means to that which is explained below.

Namely, the transmitting apparatus of the present invention for transmitting the encoded data obtained by encoding a digital signal to the other apparatus via a network is characterized in comprising a memory means (for example, contents accumulating means 33 of FIG. 5) for storing the encoded data encoded previously for each part, a reading means (for example, control means 32 of FIG. 5) for reading the encoded data of corresponding part from the memory means, a multiplexing means (for example, multiplexing means 34 of FIG. 5) for multiplexing the encoded data read by the reading means and a transmitting means (for example, transmitting means 35 of FIG. 5) for transmitting the encoded data multiplexed by the multiplexing means.

The transmitting apparatus of the present invention is further characterized in additionally comprising an adding means (for example, control means 32 of FIG. 5) for adding, to the encoded data stored in the memory means, the control information to control the group ID for identifying the group to which the encoded data belong and the encoded data.

Meanwhile, the receiving apparatus of the present invention for receiving the encoded data obtained by encoding a digital signal via a network is characterized in comprising a receiving means (for example, receiving means 41 of FIG. 6) for receiving an encoded data, a separating means (for example, separating means 51 of FIG. 6) for separating the encoded data received by the receiving means to the encoded data for each part and control information including the group ID, a decoding means (for example, part decoding means 52-1 to 520-M of FIG. 6) for decoding the encoded data separated by the separating means, a management means (for example, control group ID management memory 62 of FIG. 10) for administrating the part corresponding to the group ID separated by the separating means, a setting means (for example, control signal receiving means 61 of FIG. 10) for setting the group of the part administrated by the management means to the predetermined group and a control means (for example, audio signal output means 43 of FIG. 6) for controlling the encoded data decoded by the decoding means based on the group ID preset by the setting means.

FIG. 1 illustrates a structure of an embodiment of the transmitting system to which the present invention is applied. In this transmitting system, when an audio signal such as a music signal is requested via the network, for example, such as the Internet, ISDN (Integrated Service Digital Network), LAN (Local Area Network) and PSTN (Public Switched Telephone Network) to the server 1 from client terminals 3-1, 3-2 (hereinafter described as client terminal 3 when it is not required to individually discriminate these terminals, including the other apparatuses), the server 1 transmits the encoded data obtained by encoding the audio signal corresponding to the requested music by the predetermined encoded method to the client terminal 3 via the network 2. The client terminal 3 receives the encoded data from the server 1 and then decodes and reproduces the audio signal of such music on the real-time basis (streaming reproduction).

In the transmitting system of FIG. 1, the data transmitted from the server 1 is divided to the parts such as "drum", "bass", "piano", "guitar", "vocal" and "chorus" as illustrated in FIG. 2. The data of the divided parts include, for example, MIDI (Musical Instruments Digital CA Interface) data ("Drum", "Bass", "Piano" and "Guitar") in addition to the actual audio waveform data ("Vocal" and "Chorus"). However, MIDI has the restriction for 16 parts maximum (channels) as its standard. The client terminal 3 receives the data transmitted from the server 1 and then outputs after mixing these signals to a stereo or monaural signal.

FIG. 3 illustrates a structural example of hardware of the server 1 of FIG. 1. ROM (Read Only Memory) 11 stores, for example, the IPL (Initial Program Loading) program or the like. CPU (Central Processing Unit) 12 executes, for example, the program of an OS (Operating System) stored (recorded) in an external memory means 16 depending on the IPL program stored in ROM 11 and moreover executes the encoded process of the audio signal and transmitting process to the client terminal 3 of the encoded data obtained by the encoding process by executing various application programs stored in the external memory means 16 under the control of OS. RAM (Random Access Memory) 13 stores the programs and data required for operations of CPU 12.

The input means 14 is composed, for example, of a keyboard, mouse, microphone and external interface, etc. and it is manipulated for inputting necessary data and commands. Moreover, the input means 14 also functions as an interface for accepting input of the digital audio signal to be offered to the client terminal 3 from the external side. The output means 15 is composed, for example, of a display, speaker and printer, etc. in order to display an output the necessary information. The external memory means 16 is composed, for example, of a hard disk to store OS and application programs explained above. Moreover, the external memory means 16 also stores the data required for operations of CPU 12. The communication means 17 controls necessary communications via the network 2.

FIG. 4 illustrates a structural example of hardware of the client terminal 3 of FIG. 1. The client terminal 3 is composed of ROM 21 or communication means 27 and is basically structured almost in the same manner as the server 1 composed of ROM 11 or communication means 17 as explained above.

However, the external memory means 26 stores, for example, as the application programs, the program for decoding the encoded data sent from the server 1 and the program for executing the processes explained later. CPU 22 decodes and reproduces the encoded data when such application programs are executed.

FIG. 5 illustrates a structural example for functions of server 1 of FIG. 3. This structure is realized when the CPU 12 executes the application programs stored in the external memory 16.

Moreover, it is assumed that the audio signal to be supplied to the client terminal 3 is already encoded for each part by the external authoring tool and is stored in the contents accumulating means 33. The data of each part also includes the MIDI data in addition to the actual audio signal waveform itself.

The audio signal can be encoded, for example, by linear PCM (Pulse Code Modulation), ADPCM (Adaptive Differential PCM), layer 1, 2, 3 of MPEG (Moving Picture Experts Group), ATRAC (Adaptive Transform Acoustic Coding) and ATRAC 2. The encoding method for each part may be identical or different.

The receiving means 31 receives the request signal from the client terminal 3 via the network 2 and then outputs the received request signal to the control means 32.

The control means 32 extracts the request signal from the request signal supplied and then decides whether this request may be satisfied or not. When it is decided that the request from the client terminal 3 is never satisfied, the control means 32 generates a message that the request cannot be satisfied and then outputs this message to the multiplexing means 34. The multiplexing means 34 outputs the received message to the client terminal 3 via the transmitting means 35. The request from the client terminal 3 cannot be satisfied, for example, when the data corresponding to the request contents is not accumulated in the contents accumulating means 33 or when access from the client terminal 3 is conducted exceeding the number of times of access permitted by the server 1.

When the request from the client terminal 3 is decided to be satisfied, the control means 32 reads the data depending on the request from the contents accumulating means 33 and then supplies the data to the multiplexing means 34. In this case, the control means 32 adds the necessary control information (for example, control signal (including the group ID), reproduction start time, etc.) to the data read out and then supplies this data to the multiplexing means 34. The data supplied to the multiplexing means 34 from the contents accumulating means 33 is divided for each part.

The multiplexing means 34 multiplexes the data for each part (channel) supplied from the contents accumulating means 33 into one data stream. In this case, multiplexing may be done through the time division multiplexing of each part in the predetermined length. When the reproduction start time of each part is different, the data stream of the sooner reproduction start time is multiplexed first. Or, it is also possible to multiplex the data stream having higher importance depending on the importance of each part. The multiplexed data is then supplied to the transmitting means 35.

The transmitting means 35 converts the data supplied from the multiplexing means 34 into the format corresponding to the communication protocol suitable for the network 2 and then transmits the encoded data obtained by the format conversion to the client terminal 3 via the network 2.

FIG. 6 illustrates a structural example for functions of the client terminal 3 of FIG. 4. This structure can be realized when the CPU 22 executes the application program stored in the external memory means 26.

The encoded data transmitted from the server 1 via the network 2 is then supplied to the receiving means 41. The receiving means 41 receives the encoded data and then converts the format thereof to that corresponding to the format conversion in the transmitting means 35 and thereafter supplies the data to the decoding means 42. The decoding means 42 decodes the encoded data supplied from the receiving means 41.

Namely, the decoding means 42 is composed of a separating means 51, M part decoding means 52-1 to 52-M, a control means 53 and a reproduction timing adjusting means 54. The number of part decoding means 52 (M) forming the decoding means 42 is matched with the number of parts transmitted from the server 1 via the network 2. However, when the part decoding means 52 is designed to decode a plurality of parts through the time division multiplexing, the number of part decoding means 52 is not always required to be matched with the number of parts. Namely, when only one part decoding means 52 is used, the part decoding means 52 processes sequentially a plurality of parts for the predetermined period and then supplies the result of decoding to the reproduction timing adjusting means 54.

The encoded data output from the receiving means is supplied to the separating means 51. The separating means 51 separates the encoded data supplied to each part and supplies the data of each separated part to the corresponding part decoding means 52-$i$ (i=1, 2, . . . , M) among the part decoding means 52-1 to 52-M. Moreover, the separating means 51 supplies the reproduction start times arranged in the header area of each part to the reproduction timing adjusting means 54 and also supplies the control signals (for example, sound volume control signals) also arranged in the header area to the control means 53.

The part decoding means 52-$i$ decodes the encoded data supplied from the separating means 51 to the original data and supplies the decoded data to the reproduction timing adjusting means 54. The reproduction timing adjusting means 54 adjusts the output timing to the audio signal output means 43 so that the part of the audio signal supplied from the part decoding means 52-$i$ is output (reproduced) from the audio signal output means 43 at the reproduction start time supplied from the separating means 51 and then supplies the signal to the audio signal output means 43. In this case, the reproduction timing is adjusted by the comprised buffer memory.

To the control means 53, the control signal from the separating means 51 and the control signal from users are supplied. A user is requested to manipulate the input means 24 (for example, keyboard and mouse) while observing the manipulation panel displayed on the output means 52 (for example, display) explained later to input the control signal. The control means 53 accepts, in preferential, the control signal from user and outputs the supplied control signal to the audio signal output means 43.

The audio signal output means 43 conducts the D/A conversion for the audio signal of each part (channel) supplied from the reproduction timing adjusting means 54 and moreover outputs the data after mixing to the stereo or monaural signal based on the control signal supplied from the control means 53. The audio signal output from the audio signal output means 43 is output from a speaker forming the output means 25 (FIG. 4).

Next, the concept of the grouping for summarizing a plurality of parts (channels) to one group will then be explained.

FIG. 7 illustrates an example of grouping of each part such as "Drum" (MIDI), "Bass" (MIDI) and "Percussion"

(MIDI) with the concept of "Rhythm". Thereby, each part belonging to the same group can be controlled (for example, sound volume control) with one control signal. The grouping of each part is performed without discrimination for audio waveform data and MIDI data. Namely, the audio waveform data and MIDI data can be summarized into one group.

In addition, the grouping can also be realized for each note (corresponding to the keys of piano) number as illustrated in FIG. 8A. In the example of FIG. 8A, the note numbers 1 to 12 and the note number 18 are grouped as ID0. Moreover, the note numbers 19 to 24 are grouped as ID1. Moreover, the note numbers 13 to 17 and the note numbers 25 to 36 are grouped as ID2.

As illustrated in FIG. 8B, a plurality of groups can also be summarized to a still larger group in the hierarchical structure. In the example of FIG. 8B, the channel (part) 1, channel 2 and channel 3 are summarized as the group of ID1. In addition, the channel 4 and channel 5 are summarized to the group ID2. In addition, the group ID1 and group ID2 and channel 6 are summarized to the group ID3.

The control signal for the grouping is stored in the header area of each part transmitted from the server 1 and the separating means 51 extracts this control signal and supplies to the control means 53. Moreover, a user also can manipulate the input means 24 to input the control signal for individual grouping.

Figure 9A:
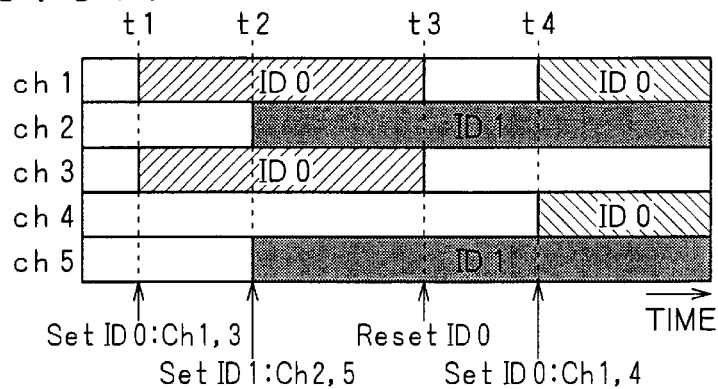

The control signal for the grouping includes the group ID (GpID) for identifying the group and causing the predetermined channel (part) to belong to the predetermined group and to cancel the grouping. For example, in the example of FIG. 9A, the channel 1 and channel 3 are set first at the time $t_1$ to the group of ID0. At the time $t_2$, the channel 2 and channel 5 are set to the group of ID1. At the time $t_3$, the group of ID0 is reset. At the time $t_4$, the channel 1 and channel 4 are newly set to the group of ID0. As illustrated in FIG. 9A, the grouping can be conducted at the desired time and the grouping can also be canceled at the desired time.

Figure 9B:
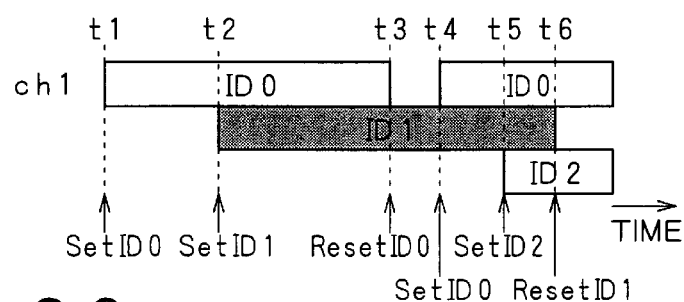
Figure 9C:
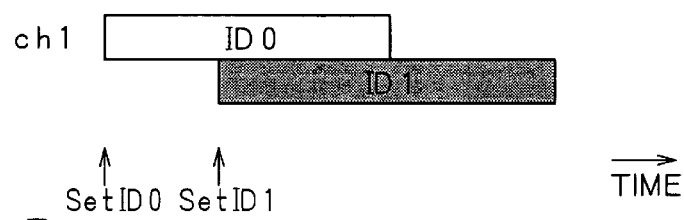
Figure 9D:
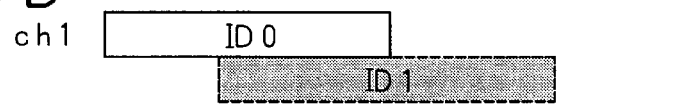
Figure 9E:
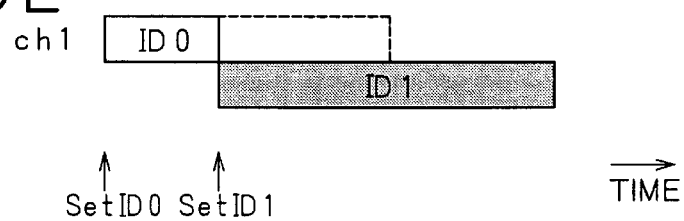

Next, grouping of one channel (part) to a plurality of groups will be explained. In the example of FIG. 9B, the channel 1 is set to the group of ID0 at the time $t_1$. The channel 1 is set to the group of ID1 at the time $t_2$ and the group of ID0 is reset at the time $t_3$. Therefore, the channel 1 belongs to both groups of ID0 and ID1 during the period from the time $t_2$ to the time $t_3$. Moreover, the channel 1 is set to the group of ID0 at the time $t_4$, set to the group of ID2 at the time $t_5$ and the group of ID1 is reset at the time $t_6$. Accordingly, the channel 1 belongs to both groups of ID0 and ID1 during the period from the time $t_4$ to the time $t_5$ and also belongs to the groups of ID0, ID1 and ID2 during the period from the time $t_5$ to the time $t_6$. Whether one channel (part) belongs to a plurality of groups or not is determined by the client terminal 3. For example, in the case where the channel 1 which belongs to the group ID0 is then caused to belong to the group ID1, it is determined by the client terminal 3 that the channel 1 belongs also to the group ID1 (FIG. 9C), the channel 1 does not belong to the group ID1 (FIG. 9D) or the channel 1 belongs to the group ID1 (FIG. 9E) after the group ID0 is canceled.

FIG. 10 illustrates a structural example of the control means 53 of FIG. 6. To the control signal receiving means 61, the control signal is supplied from the separating means 51. Moreover, a user supplies the desired control signal to the control signal receiving means 61 by manipulating the input means 24. The control signal receiving means 61 accepts preferentially the control signal from the user with the control signal from the separating means 51.

When the control signal is accepted, the control signal receiving means 61 processes and outputs the control signal by referring to the control group ID management memory 62. The control group ID management memory 62 has the tables illustrated in FIG. 11A, FIG. 11B and FIG. 11C for management whether to which group each part (note No.) belongs.

The table of FIG. 11A administrates to which group each part (channel) belongs. It can be understood from the table of FIG. 11A that to which group of ID0 the MIDI data of channel 1, MIDI data of channel 2 and audio data of channel 1 belong. The MIDI data of channel 3 can be known to belong to the group ID1. The audio data of channel 2 can be known to belong to the group of ID2.

The table of FIG. 11B administrates to which group each part belongs. From the table of FIG. 11B, it can be understood that the MIDI data of channel 1, MIDI data of channel 2 and audio data of channel 1 belong to the group of ID0. It is also understood that the MIDI data of channel 3 belongs to the group ID1 and the audio data of channel 2 belongs to the group of ID2.

The table of FIG. 11C administrates to which group each note number belongs in the MIDI data of channel 1. In an example of FIG. 11C, the note numbers 1 to 12 and the not number 18 are grouped as ID0. Moreover, the note numbers 13 to 17 and the note numbers 25 to 36 are grouped as ID2.

Next, processing operations in the control signal receiving means 61 will be explained by referring to the flowchart of FIG. 12.

In the step S1, when the control signal receiving means 61 receives the control signal, the control signal receiving means 61 extracts the group ID from the control signal.

In the step S2, the control signal receiving means 61 refers to the control group ID management memory 62 and in the step S3, whether the extracted ID is already set or not is determined.

When it is determined that the extracted group ID is already set in the step S3, the process goes to the step S4 and the control signal receiving means 61 determines whether re-setting is possible or not. When it is determined that the resetting is impossible in the step S4, the processing operation is terminated. When it is determined that re-setting is possible in the step S4, the processing operation goes to the step S6 and the control signal receiving means 61 cancels the setting of group ID and then processing operation goes to the step S6.

When it is determined that the extracted group ID is not yet set in the step S3, the processes of the step S4 and step S5 are skipped to go to the step S6.

In the step S6, the control signal receiving means 61 refers to the control group ID management memory 62 to determine whether the part to be set to the designated group is already administrated by the other group ID or not.

When it is determined in the step S6 that the part to be set to the designated group is already administrated by the other group ID, processing operation goes to the step S7. Here the control signal receiving means 61 determines whether a plurality of group IDs can be set to one part or not. When it is determined in the step S7 that a plurality of group IDs can be set to one part, processing operation goes to the step S8. When it is determined in the step S7 that a plurality of group IDs cannot be set to one part (refer to FIG. 9D and FIG. 9E), processing operation goes to the step S9.

When it is determined in the step S6 that the part to be set to the designated group is not administrated by the other group ID, the process in the step S7 is skipped and processing operation goes to the step S8.

In the step S8, the control signal receiving means 61 sets the part to the designated group (written to the control group ID management memory 62) and processing operation goes to the step S9.

In the step S9, the control signal receiving means 61 determines whether setting of all parts is completed or not. When it is determined in the step S9 that setting of all parts is not yet completed, processing operation returns to the step S6 and subsequent processes are repeated. When it is determined in the step S9 that setting of all parts is completed, the processing operation is also completed.

Next, a method of controlling the grouped parts for each group will be explained. As the control of each group, adjustment of sound volume and localization and ON-OFF of effects such as chorus and reverberation can be thought. However, volume control will be explained here.

FIG. 13 illustrates a structural example of the audio signal output means 43 of FIG. 6. To the control means 71, the MIDI signal or audio signal is supplied from the reproduction timing adjusting means 54. To the selecting means 72, the control signal including the group ID is supplied from the control signal receiving means 61 of the control means 53 is supplied. The control signal is the signal, for example, having the contents that "Reduce the sound volume only for 20dB".

When the control signal is supplied, the selecting means 72 refers to the control group ID management memory 62 of the control means 53 (FIG. 10) to confirm the part included in the group ID of the control signal and then supplies the control signal to the control means 71. The control means 71 performs the designated control to each part (MIDI signal or audio signal) supplied to convert the controlled digital signal to the D/A converting means 73. The D/A converting means 73 converts the supplied digital signal to an analog signal to provide an output.

Here, user's manipulation for controlling the sound volume will be explained. FIG. 14 illustrates an example of the manipulation panel displayed on the output means (display) 25. The slide bars 81 to 84 are provided for adjusting sound volume of each group of the group ID1 to group ID4 (when the number of groups is five or more, the slide bars are set to five or more). A user can adjust the sound volume of the groups of ID1 to ID4 by dragging the slide bars 81 to 84 with the input means (mouse) 24. The input control signal is supplied to the control signal receiving means 61 of control means 53 by manipulating the slide bars 81 to 84.

A receiving data displaying means 85 displays, for example, the music name of the receiving data, name of composer and copyright owner name, etc. Moreover, during the reproducing operation, the receiving data displaying means 85 displays the measure number, reproducing time, tempo, key, etc. Moreover, during the communication, the receiving data displaying means 85 displays a receiving bit rate of the data received. These displays may be set freely. A stop button 86 is used to stop the reproduction of contents. A reproduction button 87 is used to start the reproduction of contents. A temporary stop button 86 is used to temporarily stop the reproduction of contents.

Moreover, as illustrated in FIG. 15A, a user can set the sound volume of the corresponding group to the maximum level by sliding the slide bars 81 to 84 to the maximum position. Moreover, a user can set the sound volume of corresponding group to the minimum level by sliding the slide bars 81 to 84 to the minimum position.

Value of sound level control when the slide bars 81 to 84 slide between the maximum position and minimum position changes linearly as illustrated in FIG. 15B. Moreover, it is also possible to realize non-linear change of sound level as illustrated in FIG. 15C. While the slide bars 81 to 84 are sliding because a user manipulates the input means 24, positions of the slide bars 81 to 84 are always detected and the corresponding sound volume control signal is supplied to the control signal receiving means 61 of the control means 53. Moreover, it is also possible that when the sliding operation of slide bars 81 to 84 is completed, the corresponding sound volume control signal is calculated and it is then supplied to the control signal receiving means 61 of the control means 53.

FIG. 16 illustrates the other structural example of the audio signal output means 43 of FIG. 6. In this example, the control means 82-1 to 93-3 and selecting means 91-1 to 91-3 are provided in the same number as the parts (three parts in this case).

Processing operation of the selecting means 91-$i$ ($i$=1, 2, 3) will be explained with reference to the flowchart of FIG. 17. First, when a user executes the sound volume control by manipulating the input means 24, the control signal receiving means 61 of the control means 53 transmits the corresponding control signals (group ID and sound volume control signal) to the selecting means 91-$i$ of the audio signal output means 43. In the step S21, the selecting means 91-$i$ receives the group ID and sound volume control signal and then goes to the step S22.

The selecting means 91-$i$ refers, in the step S22, to the control group ID management memory 62 to determine whether the part (channel) being supplied belongs to the received group ID or not. When it is determined in the step S22 that the part being supplied does not belong to the received group ID, processing operation is completed. When it is determined in the step S22 that the part being supplied belongs to the received group ID, processing operation goes to the step S23. In the step S23, the selecting means 91-$i$ transmits the sound volume control signal being supplied to the control means 92-$i$. Thereby, processing operation is completed.

Next, processing operation of the control means 92-$i$ will be explained by referring to the flowchart of FIG. 18. The control means 92-$i$ receives the sound volume control signal transmitted from the selecting means 91-$i$ in the step S31 and processing operation goes to the step S32. In the step S32, the control means 92-$i$ performs the process corresponding to the sound volume control signal to the signal supplied (MIDI signal or audio signal) to complete the processing operation.

Next, the other processing operation of the selecting means 91-$i$ will be explained with reference to the flowchart of FIG. 19. First, when a user manipulates the input means 24 for sound volume control, the control signal receiving means 61 of the control means 53 transmits the corresponding control signals (group ID and sound volume control signal) to the selecting means 91-$i$ of the audio signal output means. The selecting means 91-$i$ receives the group ID and sound volume control signal in the step S41 and then goes to the step S42.

In the step S42, the selecting means 91-$i$ refers to the control group ID management memory 62 to determine whether the part being supplied belongs to the received group ID or not. When it is determined in the step S42 that the part being supplied belongs to the received group ID, processing operation goes to the step S43. In this step, the selecting means 91-*i* adds the control ON signal to the sound volume control signal and transmits it to the control means 92-*i* to complete the processing operation. In the step S42, when it is determined that the part being supplied does not belong to the received group ID, processing operation goes to the step S44. In this step, the selecting means 91-*i* adds the control OFF signal to the sound volume control signal and transmits the signal to the control means 92-*i* to complete the processing operation.

Next, processing operation of the control means 92-*i* corresponding to the operation of such selecting means 91-*i* will be explained by referring to the flowchart of FIG. 20. In the step S51, the control means 92-*i* receives the sound volume control signal (including the control ON/OFF signal) transmitted from the selecting means 91-*i* and then goes to the step S52.

The control means 92-*i* determines, in the step S52, that whether the received control ON/OFF signal is the control ON signal or not. When the received control ON/OFF signal is determined as the control ON signal in the step S52, processing operation goes to the step S53 and the control means 92-*i* executes the process corresponding to the sound volume control signal to the supplied signal (MIDI signal or audio signal) to complete the processing operation. When the received control ON/OFF signal is determined as the control OFF signal in the step S52, the process of the step S53 is skipped to complete the processing operation.

Next, the other processing operations of the selecting means 91-*i* will be explained with reference to the flowchart of FIG. 21. First, when a user manipulates the input means 24 to execute the sound volume control, the control signal receiving means 61 of the control means 53 transmits the corresponding control signals (group ID and sound volume control signal) to the selecting means 91-*i* of the audio signal output means 43. In the selecting means 91-*i* receives the group ID and sound volume control signal in the step S61 and then goes to the step S62.

In the step S62, the selecting means 91-*i* refers to the control group ID management memory 62 to determine whether the part being supplied belongs to the received group ID or not. When it is determined in the step S62 that the part being supplied belongs to the received group ID, processing operation goes to the step S63 and the selecting means 91-*i* transmits, in this step, the sound volume control signal to the control means 92-*i*. In the step S64, the selecting means 91-*i* writes the sound volume control value of part to the control group ID management memory 92 to complete the processing operation.

In the step S62, when it is determined that the part being supplied does not belong to the received group ID, processing operation goes to the step S65. In this step, the selecting means 91-*i* reads the sound volume control value of part from the control group ID management memory 62. In the step S66, the selecting means 91-*i* transmits the read out sound volume control value to the control means 92-*i* as the sound volume control signal to complete the processing operation.

Next, the processing operations of the control means 92-*i* corresponding to the operation of the selecting means 91-*i* will be explained by referring to the flowchart of FIG. 22. In the step S71, the control means 92-*i* receives the sound volume control signal transmitted from the selecting means 91-*i* and then goes to the step S72. In this step S72, the control means 92-*i* executes the process corresponding to the sound volume control signal for the supplied signal (MIDI signal or audio signal) to complete the processing operation.

Namely, when it is determined that the part being supplied does not belong to the received group ID, the sound volume control value of the part is never updated and therefore the sound volume of the part is actually never changed.

FIG. 23 illustrates the other structural example of the audio signal output means 43 of FIG. 6. In this example, only one selecting means 101 is provided and the control means 102-1 to 102-3 are provided in the same number as the number of parts.

Processing operation of the selecting means 101 will be explained by referring to the flowchart of FIG. 24. First, when a user manipulates the input means 24 for the sound volume control, a control signal receiving means 61 of the control means 53 transmits the corresponding control signals (group ID and sound volume control signal) to the selecting means 101 of the audio signal output means 43. In the step S81, the selecting means 101 receives the group ID and sound volume control signal and then goes to the step S82. In the step S82, the selecting means 101 refers to the control group ID management memory 62, retrieves the part belonging to the received group ID and then goes to the step S83.

In the step S83, the selecting means 101 determines whether the part to be controlled is retrieved or not. When it is determined that the part to be controlled is retrieved in the step S83, processing operation goes to the step S84 and the selecting means 101 transmits the sound volume control signal to the corresponding control means 102-*i*.

In the step S85, the selecting means 101 determines whether the sound volume control signal is transmitted or not to the control means 102-*i* corresponding to all parts to be controlled. When it is determined that the sound volume control signal is not transmitted to the control means 102-*i* corresponding to all parts to be controlled, processing operation returns to the step S84 and subsequent processes are repeated. When it is determined in the step S85 that the sound volume control signal is transmitted to the control means 102-*i* corresponding to all parts to be controlled, processing operations is completed. When it is determined in the step S83 that the parts to be controlled are not yet retrieved, the processes of the steps S84 and S85 are skipped and processing operation is completed.

Next, processing operation of the control means 102-*i* corresponding to the process of such selecting means 101 will be explained with reference to the flowchart of FIG. 25. In the step S91, the control means 102-*i* receives the sound volume control signal transmitted from the selecting means 101 and then goes to the step S92. In the step S92, the control means 102-*i* executes the process corresponding to the sound volume control signal for the signal (MIDI signal or audio signal) supplied to complete the processing operation.

Next, the method for controlling only the predetermined group by user in place of controlling all groups set for user when one part is set to a plurality of groups will be explained.

For example, in the example of FIG. 26, "Bass", "Drum", "Guitar", "Piano" and "Chorus" are set to the group 1 (Karaoke), while "Vocal" (male) and "Vocal" (female) are set to the group 2 (Vocal), respectively. Moreover, "Bass" and "Drum" are set to the group 3 (Rhythm), "Guitar" and "Piano" to the group 4 (other than rhythm), and "Chorus", "Vocal" (male) and "Vocal" (female) to the group 5 (song), respectively. Moreover, the group 1 and group 2 are set to the group 6 (presentation 1), while the group 3, group 4 and group 5 to the group 7 (presentation 2), respectively. The groups I to 5 are provided for controlling the part, while the groups 6 and 7 are provided for determining the controllable group (presentation).

FIG. 27 illustrates an example of the manipulation panel to be displayed on the output means (display) 25. The manipulation panel of FIG. 27 is formed by adding a toggle switch 111 to the manipulation panel of FIG. 14. The toggle switch 111 is used to change over the controllable groups. In this figure, it is illustrated that the group 6 (presentation) is selected. Therefore, the slide bars 81 and 82 corresponding to the group 1 and group 2 belonging to the group 6 are displayed. Therefore, a user can control only the group 1 and group 2. Moreover, a user can change over the group 6 and group 7 by clicking the toggle switch 111 with the input means 24. Other buttons are same as those of FIG. 14 and the explanation thereof is omitted here.

Next, the processing operation for changing the group to be controlled will be explained with reference to the flowchart of FIG. 28. Here, it is assumed that the audio signal output means 43 is structured as illustrated in FIG. 16.

First, when a user manipulates the input means 24 to issue an instruction for sound volume control or change of group to be controlled, the control signal receiving means 61 of the control means 53 transmits the corresponding control signals (including the group ID) to the selecting means 91-$i$ of the audio signal output means 43. In the step S101, the selecting means 91-$i$ receives the control signal and goes to the step S102.

In the step S102, the selecting means 91-$i$ refers to the control group ID management memory 62 to determined whether the part being supplied belongs to the received group ID or not. When it is determined in the step S102 that the part being supplied belongs to the received group ID, processing operation goes to the step S103. In this step, the selecting means 91-$i$ refers to the control group ID management memory 62 to determine whether the received group ID is the group ID (group 6 or group 7 in the example of FIG. 26) for management (presentation) of the group to be controlled or not.

When it is determined in the step S103 that the received group ID is used for management of the group to be controlled, processing operation goes to the step S104 and the selecting means 91-$i$ transmits, in this step, the presentation control signal to the control means 92-$i$ to complete the processing operation. When it is determined in the step S103 that the received group ID is not the group ID for management of group to be controlled (the group ID for control of part), processing operation goes to the step S105 and the selecting means 91-$i$ transmits, in this step, the sound volume control signal to the controlling means 92-$i$ to complete the processing operation.

When it is determined in the step S102 that the part being received does not belong to the received group ID, the processes of the steps S103 to S105 are skipped to complete the processing operation.

Next, processing operation of the control means 92-$i$ will be explained by referring to the flowchart of FIG. 29.

The control means 92-$i$ determines, in the step S111, whether it has received the control signal transmitted from the selecting means 91-$i$ or not. When it is determined in the step S111 that the control signal transmitted from the selecting means 91-$i$ is not yet received, processing operation returns to the step S111. When it is determined, in the step S111, that the control signal transmitted from the selecting means 91-$i$ is received, the control means 92-I determines, in the step S112, whether the received control signal is the presentation control signal or not.

When it is determined in the step S112 that the received control signal is the-presentation control signal, processing operation goes to the step S113. In this step, the control means 92-$i$ executes the presentation control process to complete the-processing operation. Namely, with this presentation control process, the number of slide bars displayed on the manipulation panel of FIG. 27 is changed to change over the display of the toggle switch 111.

When it is determined in the step S112 that the received control signal is not the presentation control signal, processing operation goes to the step S114. In this step, the control means 92-$i$ executes the process corresponding to the sound volume control signal for the supplied signal (MIDI signal or audio signal) to complete the processing operation.

In this embodiment, a system means a theoretical aggregation of a plurality of apparatuses. In this case, it is not requested that each apparatus is provided within the same cabinet.

Moreover, in this specification, a distribution medium for distributing a computer program to execute the above processes to users also includes the transmission medium formed of the network such as the Internet and digital satellite, in addition to the information recording medium such as CD-ROM or the like.

In addition, it is also possible in this embodiment that the transmitting side is replaced with media such as a CD-ROM or the like and the receiving side is formed as the data reproducing apparatus without communicating through the network.

What is claimed is:

1. A receiving apparatus for receiving encoded data, which is obtained by encoding a digital signal, via a network, the receiving apparatus comprising:

a receiving means for receiving said encoded data, the encoded data comprising a plurality of requested parts;

a separating means for separating said encoded data received by said receiving means into the encoded data for each part and a control information including a group ID;

a decoding means for decoding said encoded data separated by said separating means;

a management means for administrating a part corresponding to said group ID separated by said separating means;

a setting means for setting the part administrated by said management means to a predetermined group; and a control means for controlling the encoded data decoded by said decoding means based on the group ID preset by said setting means.

2. The receiving apparatus as claimed in claim 1, wherein said management means administrates the group ID corresponding to a note number of the part.

3. A method of receiving encoded data, which is obtained by encoding a digital signal, via a network, the method comprising:

a receiving step for receiving said encoded data, the encoded data comprising a plurality of requested parts;

a separating step for separating said encoded data received in said receiving step into the encoded data for each part and a control information including a group ID;

a decoding step for decoding said encoded data separated in said separating step;

a management step for administrating a part corresponding to said group ID separated in said separating step;

a setting step for setting the part administered in said management step to a predetermined group; and a control step for controlling the encoded data decoded in said decoding step based on the group ID preset in said setting step.

4. A distribution medium for distributing a computer readable program for causing a receiving apparatus for receiving encoded data, which is obtained by encoding a digital signal, via a network to execute a method comprising:

a receiving step for receiving said encoded data, the encoded data comprising a plurality of requested parts;

a separating step for separating said encoded data received in said receiving step into the encoded data for each part and a control information including a group ID;

a decoding step for decoding said encoded data separated by said separating step;

a management step for administrating a part corresponding to said group ID separated in said separating step;

a setting step for setting the part administrated in said management step to a predetermined group; and a control step for controlling the encoded data decoded in said decoding step based on the group ID preset in said setting step.

* * * * *